United States Patent
Blucher

[15] 3,668,636

[45] June 6, 1972

[54] METHOD AND CIRCUIT ARRANGEMENT FOR THE RECOGNITION OF CHARACTERS

[72] Inventor: Reinhart Blucher, Darmstadt, Germany

[73] Assignee: U.S. Philips Corporation, New York, N.Y.

[22] Filed: Aug. 5, 1970

[21] Appl. No.: 61,341

[52] U.S. Cl. ........................................340/146.3AE

[51] Int. Cl. ........................................G06r 9/16

[58] Field of Search .........340/146.3 R, 146.3 AH, 146.3 AE

[56] References Cited

UNITED STATES PATENTS

| | | | |
|---|---|---|---|
| 3,245,036 | 4/1966 | Gröttrup | 340/146.3 |
| 3,213,421 | 10/1965 | Abraham, Jr. | 340/146.3 |
| 3,541,510 | 11/1970 | Nishioka | 340/146.3 |

OTHER PUBLICATIONS

IBM Tech. Discl. Bull' n, entitled " Deep Follower Vido Analysis," by P. J. Hurley et al., Vol. 8, No. 1, June 1965, pp. 126, 127.

*Primary Examiner*—Thomas A. Robinson
*Attorney*—Frank R. Trifari

[57] ABSTRACT

A method of recognition of signs in which a scanning beam, passed circularly across the overall line width of a sign, is caused to follow up the contour of a sign and in which a signal sequence significant of the sign is derived from further circular scanning ramifications, uninterrupted lines and termini of the signs being recognized from the number of black-white transitions per scanning period. The arc determined by the width and phase of the scanning pulse and covering a line last scanned within a scanning cycle is stored and compared with the arcs of the lines covered during the next-following scanning cycle for assessing coincidence. The coinciding arcs are used as recognition criteria so that no coincidence for one or more scanning cycle indicate a terminus of a sign, one coincidence per scanning cycle indicates the presence of a non-ramified line and a plurality of coincidences per scanning cycle indicate a ramification. The angular value for the direction of follow-up of the scanning circle is derived from the values of beginning and termination of the coinciding arcs.

9 Claims, 13 Drawing Figures

INVENTOR.
R. BLUCHER
BY
AGENT

INVENTOR.
R. BLUCHER
BY
Frank R. Trifari
AGENT

INVENTOR.
R. BLUCHER
BY
[signature]
AGENT

INVENTOR.
R. BLUCHER
BY
[signature]
AGENT

METHOD AND CIRCUIT ARRANGEMENT FOR THE RECOGNITION OF CHARACTERS

The invention relates to a method and a circuit arrangement for the recognition of characters, by the contour analyzing method.

A contour analyzing method is know in which a light spot describes a small circle, guided so that it travels along the boundary line between the white paper background and the line of the character. When the light spot touches the black character line from the white background, a propulsive pulse is produced, which causes the scanning circle to pass along the side of the character (IBM Journal, Jan. 1963, Greanias, Meagher, Norman, Essinger: The recognition of handwritten numerals by contour analysis).

This known method is shown schematically in FIG. 1. In this method a sequence of signals defining the contour of the character is generated; the recognition of the ramifications characteristic of the character, hereinafter referred to as a sign, is not possible without the need for further means. Moreover the steadiness of the follow-up is adversely affected by the practically unavoidable imperfections of printing of the sign to be scanned so that no sharp but an unsteady black-white transition is obtained.

In the method according to the invention a scanning beam passed in the form of a circle across the overall line width of a character follows up the contour of a sign, the follow-up criteria providing a signal sequence significant for the sign and the number of black-white transitions in each scanning period permitting the recognition of ramifications, line continuities and sign termini. The method according to the invention is characterized in that of the angular range of the line last covered in a scanning cycle, said range being determined by the width and phase position of the scanning pulse, is stored compared with respect to coincidence with the angular ranges of the lines covered during the next scanning cycle and the coinciding angular ranges are employed as criteria for recognition. The criteria are; no coincidence during one or more scanning cycles indicating the terminus of a sign, one coincidence per scanning cycle indicating the presence of an unramified line and a plurality of coincidences per scanning cycle indicating ramification. The angular range is derived from the initial and final values of the coinciding angular ranges for the follow-up direction of the scanning circle.

There is known a method (German Pat. specification No. 1,175,471) in which the diameter of the scanning circle is chosen to exceed the width of the line of the sign to be scanned and in which the terminus of the sign, the uninterrupted line and the ramification are recognized from the number of black-white transitions. However, in this known method the recognition from the number of white-black pulses covers a plurality of full revolutions of the scanning circle. This involves various disadvantages.

1. The diameter of the circle has constantly to be in a fixed relationship to the width of the line. The diameter of the circle is therefore constantly readjusted, which requires a complicated mechanism and takes much time. This is avoided in the method according to the invention, since the diameter of the circle need only exceed the width of the line.

2. In order to obtain digital data about the presence of a line terminus, a ramification of a line or of a crossing of lines, the white-black pulses of a full revolution of the circle are counted. If the signs to be scanned are not accurately printed, but are blotted by ink around the lines of the sign to be scanned, pulses originating from interfering signals will frequently be counted in addition in said method so that erroneous data are obtained.

Said disadvantage has been recognized in the known method and therefore it is recommended to take a larger number of revolutions of the scanning circle into consideration for the evaluation.

This source of errors is substantially obviated by the method according to the invention, since white-black pulses are only taken into account when they appear in a given angular range of the scanning circle.

The invention thus restricts the sector for evaluation to the sector covered during the preceding passage so that the risk of identifying soiling, unsharp printing and so on erroneously as parts of a sign is obviated.

The follow-up criterion is obtained in the method according to the invention from the coincidences of the sector covered last in a scanning cycle with the sectors covered during the next-following scanning cycle so that unambiguous follow-up is ensured. Since the scanning spot is moved with constant angular speed along the scanning arc the phase positions of the beginning and the end of the scanning pulses produced by the sign in the scanning cycle are at the same time the angular co-ordinates of the sign relative to the center of the scanning circle concerned, so that the pulse length corresponds to one sector.

In this regard it should be noted that the follow-up criteria obtained by the known method are only unambiguous in the case of a fixed ratio between the diameter of the scanning circle and the thicknesses of the traversed lines. The thicknesses of all lines covered by the scanning circle have to be the same. Owing to this restriction the signs to be scanned have to be printed very sharply. Particularly at crossings and ramifications many signs are blurred and at these very points the thicknesses of the lines are often different.

The method according to the invention avoids these disadvantages.

Since in the known method only the first white-black side is utilized for the follow-up criterion, the probability of errors is higher than in the method according to the invention, because in the latter case a black-white edge and a white-black edge are utilized and the average value of both edges is utilized for the follow-up criterion. The known method is based on an average thickness of the lines obtained by static measurements, which value must not be considerably exceeded positively or negatively for ensuring a correct further travel of the scanning circle. In the method according to the invention on the contrary the determination of the center of the line is independent of the thickness of the line.

The method according to the invention will be described more fully with reference to 13 schematic Figures.

FIG. 4 illustrates the fundamental solution relating to the path of the scanning circle at a ramification, whereas

Figure 1:
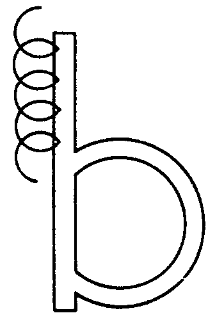
FIG. 1 shows the first-mentioned known method of contour analysis.
Figure 2:
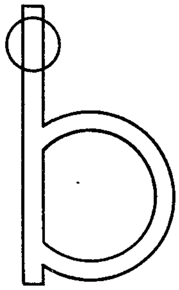
FIGS. 2 and 3 illustrate the problems involved in the method according to the invention.
Figure 3:
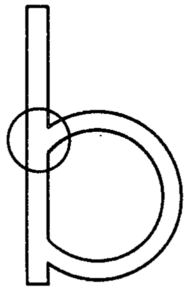
Figure 4:
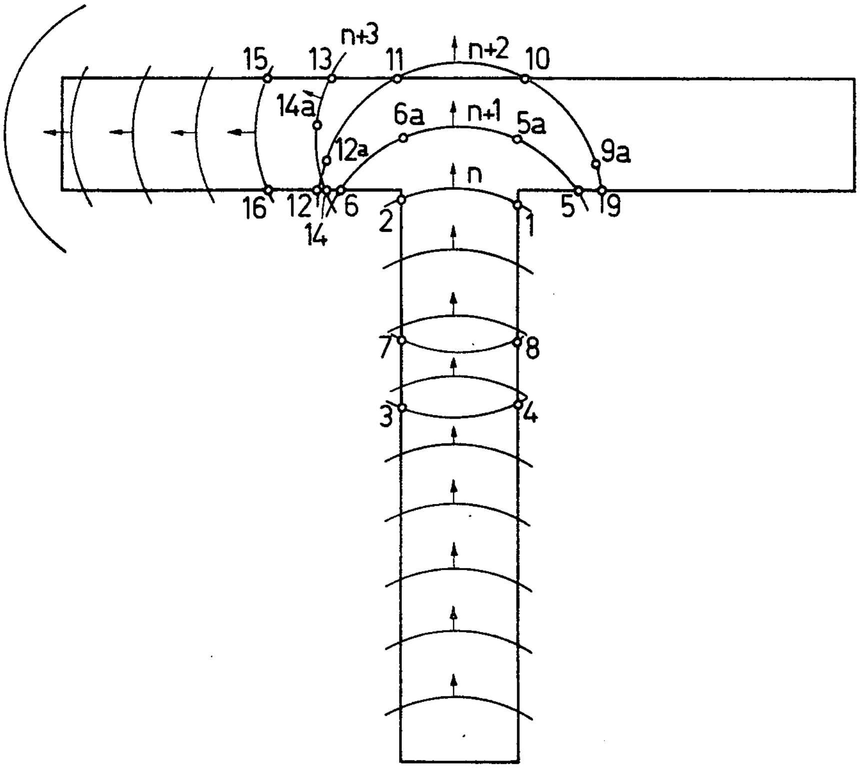

Referring to FIG. 4 it will be assumed that the scanning circle travels along a black line towards a ramification. It is furthermore supposed that the light spot describes the circle in anticlockwise direction. The angular co-ordinates of the points 1 and 2, where the light spot strikes the black line and leaves the same respectively, have to be stored. Thus the angular arc where the light spot covers the black line during the $n^{th}$ cycle is stored. During the next-following $(n+1)$th cycle of the light spot only that arc is stored which coincides at least partly with the arc stored during the $n^{th}$ cycle. The arc bounded by points 3 and 4 is therefore not stored. Only the arc 5/6 coincides partly with the arc 1/2 so that the angular co-ordinates of the points 5 and 6 are stored. A measure for the further movement of the circle is that arc which lies both in the arc 1/2 and the arc 5/6. The average value of this arc is an indication for the onward movement of the circle. This is indicated in FIG. 4 by an arrow.

At a ramification two black arcs partly coincide with the arc previously stored. For the onward movement the two arcs are taken into account, but only the arc covered last is stored. This will be explained with reference to the $(n+2)^{th}$ cycle. At point 9 (FIG. 4) the light spot passes from the white background to the black line of the sign and leaves the black line at point 10. It is ensured that this arc 9/10 is stored, since it partly coincides with the previous one. At point 11 the light spot again strikes the black sign and leaves the same at point 12. Since this arc 11/12 also partly coincides with the arc 5/6 stored during the preceding cycle, the arc 9/10 is erased from the store and supplanted by the arc 11/12.

A measure for the direction of movement is that arc which is enclosed by 5/6 and 9/10 or 11/12. This results in that the circle moves on again in the same direction (perpendicularly upwards in FIG. 4). During the $(n+3)^{th}$ cycle the arc 13/14 is stored and a measure for the onward movement is formed by the are enclosed by 11/12 and 13/14. The average value of this arc is determinative of the direction of movement. Thus the circle moves on to the left and follows up the ramification to the left.

Figure 5:
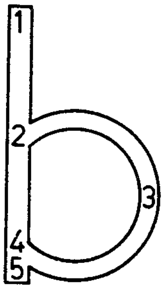
FIGS. 5 and 7 show how the contours of a complete character can be followed up.

In the method described the scanning circle moves along a ramification always along the line furthest to the left, viewed from the initial direction of movement. If, for example, the scanning circle traverses the separate lines of the character of FIG. 5 in accordance with this method, it touches the separate points in the following order of succession: 1 - 2 - 3 - 4 - 5 - 4 - 2 - 1. When the light spot describes the circle in clockwise direction instead of in anticlockwise direction as supposed above, the scanning circle follows at a ramification always the path furthest to the right. The separate points of the character of FIG. 5 are then traversed in the following order of succession: 1 - 2 - 4 - 5 - 4 - 3 - 2 - 1.

Figure 6:
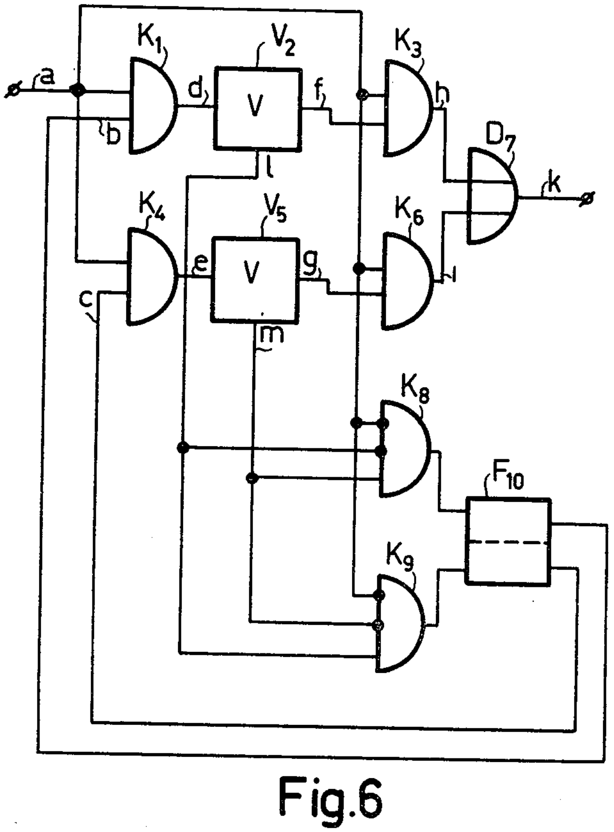
FIG. 6 shows a logical arrangement for obtaining the follow-up criterion.

FIG. 6 shows a circuit arrangement by which the method can be carried into effect. It comprises conjunctions $K_1$, $K_3$, $K_4$, $K_6$, a disjunction $D_7$, conjunctions $K_8$, $K_9$ at which some of the inputs are inverted, a bistable trigger $F_{10}$ and two delay circuits $V_2$, $V_5$. The two delay circuits are identical so that it will be sufficient to specify the properties of the upper circuit $V_2$.

Be a pulse applied to the input $d$ of the delay circuit $V_2$. It appears at the output $f$ of the delay circuit with a delay equal to the constant time required by the light spot of the scanning circle for tracing one cycle. The delay circuit can store only a single pulse. When a second pulse appears at the input $d$ of the delay circuit, whereas the first pulse is still present therein, the latter is erased and only the second pulse remains in the delay circuit. Above the digit 1 the binary signals 0 and 1 indicate whether a pulse is stored in the delay circuit or whether the circuit is empty.

Figure 8:
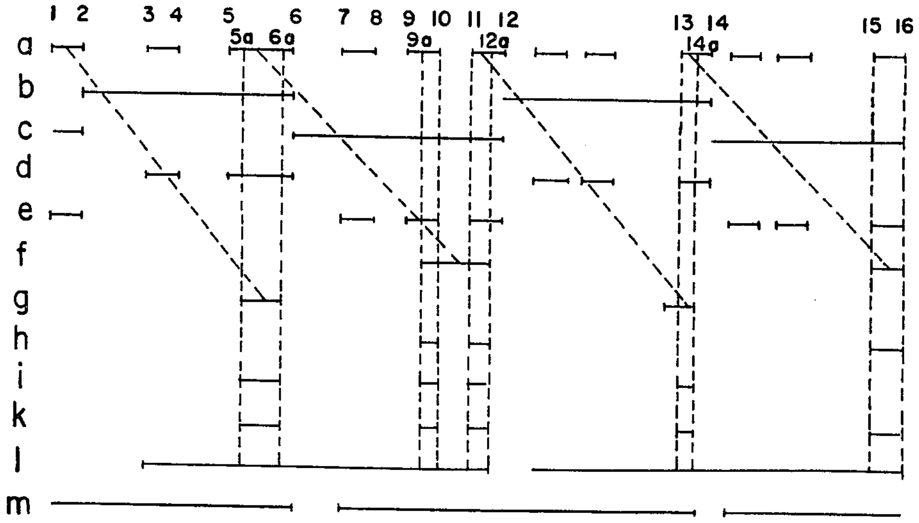
FIG. 8 shows the pulse diagram by scanning the ramification of FIG. 4 by means of the logical circuit of FIG. 6.

When the light spot traverses a black line, the binary signal 1 appears at the first input $a$ of the two conjunctions $K_1$ and $K_4$. The bistable trigger $F_{10}$ is supposed to be in the state in which it passes a "1" along the conductor $b$, while the light spot is supposed to pass from point 5 to point 6 in FIG. 4. The conjunctions $K_1$ then supplies a "1" across the conductor $d$ to the input of the delay circuit $V_2$ until the light spot has arrived at point 6 (FIG. 4 and FIG. 8). From the further development of the operations it will be obvious that during the previous cycle the pulse produced during the passage of the light spot from 1 to 2 (FIG. 4) is written in the delay circuit $V_5$. While the light spot passes from 5*a* to 6*a*, said pulse 1/2 appears at the output $g$ of the delay circuit $V_5$. Thus a "1" appears at the second input of the conjunction $K_6$ while the light spot passes from 5*a* to 6*a* (FIG. 4). Since also the first input of the conjunction $K_6$ (conductor $a$) has a "1," the output $i$ of the conjunction $K_6$ supplies a "1" via the disjunction $D_7$ to the conductor $k$ during this time. This pulse causes the onward movement of the circle. The direction of the movement is determined by the position of this pulse in time.

When the light spot has just passed by the point 6 (FIG. 4), the conjunction $K_9$ responds, since the delay circuit $V_5$ is empty so that it supplies a "0" via $m$ to the negated second input of the conjunction $K_9$. A "0" appears via the conductor $a$ at the negated first input of the conjunction $K_9$, since the light spot has again reached the white substrate. At the third input 1 of the conjunction $K_9$ a "1" appears since the delay circuit $V_2$ has stored the pulse resulting from the passage of the light spot from 5 to 6. Thus the conjunction $K_9$ supplies a "1" at its output and changes over the bistable trigger $F_{10}$. The latter cuts off the conjunction $K_1$ by a "0" via the conductor $b$ and applies a "1" via the conductor $c$ to the second input of the conjunction $K_4$. While the light spot passes from point 7 (FIG. 4) to point 8, a "1" is applied via the conductor $a$ also to the first input of the conjunction $K_4$. As a result this conjunction supplies a "1" via the conductor $e$ to the delay circuit $V_5$. The conjunctions $K_3$ and $K_6$ do not respond, however, since the two delay circuits $V_2$ and $V_5$ supply a "0" at their outputs while the light spot passes from 7 to 8. Consequently during this time no propulsive pulse is supplied. Also the conjunction $K_8$ does not respond so that the trigger $F_{10}$ remains in its actual state.

While the light spot passes from 9 to 10, the pulse passing during this time along the conductor $a$ is applied via the conjunction $K_4$ to the delay circuit $V_5$. The preceding pulse 7/8 in the delay circuit $V_5$ is thus erased. When the light spot reaches the point 9*a* (FIG. 4), the delayed pulse 5/6 arrives at the output of the delay circuit $V_2$ and provides via the conductor $f$ a "1" at the second input of the conjunction $K_3$. While the light spot passes from 9*a* to 10, the conductor $h$ conveys a "1" and the conjunction $K_3$ supplies a "1" as a propulsive pulse via the disjunction $D_7$ and the conductor $k$.

The light spot then arrives at point 11. While it passes on from 11 to 12, the pulse supplied during this time via $a$ is applied via the conjunction $K_4$ to the delay circuit $V_5$. The pulse 9/10 previously stored is erased. Moreover, the conjunction $K_3$ again responds and provides a propulsive pulse via the conductor $h$ and the disjunction $D_7$ until the light spot reaches the point 12*a*. At this instant the output $f$ of the delay circuit $V_2$ passes to "0," since the delayed pulse 5/6 has terminated. When the light spot has just passed beyond the point 12, the conjunction $K_8$ responds and changes over the trigger $F_{10}$. As a result the conjunction $K_4$ is cut off and a "1" is applied to the second input of the conjunction $K_1$. Thus the pulses produced across the conductor $a$ during the passage of the light spot across black lines arrive again through the conjunction $K_1$ at the input of the delay circuit $V_2$. Each further pulse erases the previous pulse in the delay circuit. The next-following two pulses are produced like the pulses 3/4 and 7/8 by the reiterative passage across the line already scanned and as described above, owing to the conditions at the outputs of the delay circuits $V_2$ and $V_5$ they do not result in an output pulse $k$.

Finally the light spot arrives at point 13 (FIG. 4). The pulse produced during the passage of the light spot from 13 to 14 is applied via the conjunction $K_1$ to the input $d$ of the delay circuit $V_2$. While the light spot passes from 13 to 14*a*, a propulsive pulse is applied to the conductor $k$ via the conjunction $K_6$ and the disjunction $D_7$. When the light spot arrives at point 14*a* (FIG. 4) the delayed pulse stored during the passage of the light spot from 11 to 12 has left the delay circuit $V_5$ and the output conductor $g$ again changes over to "0." Since the delay circuit $V_5$ is again empty, the conjunction $K_9$ again responds as soon as the light spot arrives at point 14 (FIG. 4) and the bistable trigger $F_{10}$ is changed over. Thus the conductor $b$ conveys a "0" and cuts off the conjunction $K_1$. The subsequent black pulses then attain via the conjunction $K_4$ and the conductor $e$ the delay circuit $V_5$.

Figure 7:
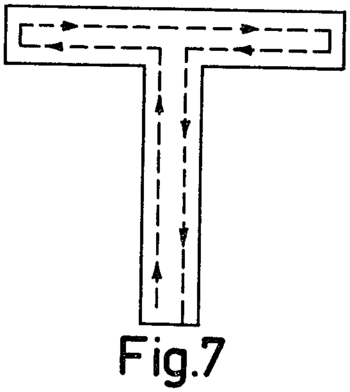

The operations are then repeated in the manner described and the light circle travels, viewed in FIG. 4, constantly further to the left until it passes beyond the end of the line. In this position of the circle the light spot passes during a full revolution only once across the written line. Thus the new direction of movement is fixed so that the light circle reverses towards the ramification. At the ramification it passes on the left-hand side and travels in the right-hand arm of FIG. 4. i.e. in downward direction. In this way the written sign concerned is systematically scanned until the operation is terminated. FIG. 7 illustrates the path of the light circle.

FIG. 8 shows by way of explanation the pulse-time diagram of the circuit arrangement of FIG. 6. On the left-hand side the separate conductors of the arrangements and above the separate points of FIG. 4 traversed in order of succession by the light spot are plotted. A black dash means that the conductor concerned of the arrangement conveys the sign "1." No black dash means that the conductor of the arrangement has the signal "0." The inclined lines of connection illustrate the delivery of the last pulse of each scanning period from the store.

Figure 9:
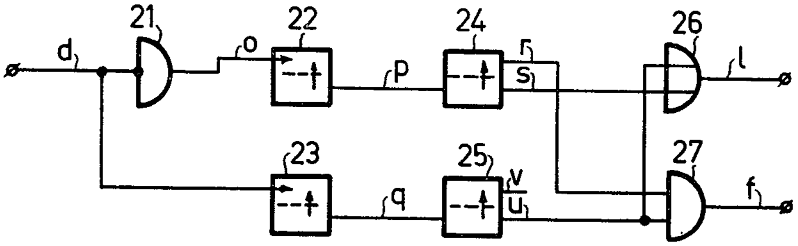
FIG. 9 shows one embodiment of the delay circuits of FIG. 6 in a block diagram and FIG. 10 illustrates the current variations of the delay circuits.

The two identical delay circuits $V_2$ and $V_5$ (FIG. 6) may be formed by monostable trigger circuits of the kind shown in FIG. 9, as shown in the embodiment of the delay circuit $V_2$. Referring to FIG. 9, reference numerals 22 and 23 designate monostable triggers of known construction. They are changed over by a signal change from "1" to "0" at the inputs *d* and *a* respectively; 21 designates an invertor, 26 a disjunction and 27 a conjunction.

Figure 10:
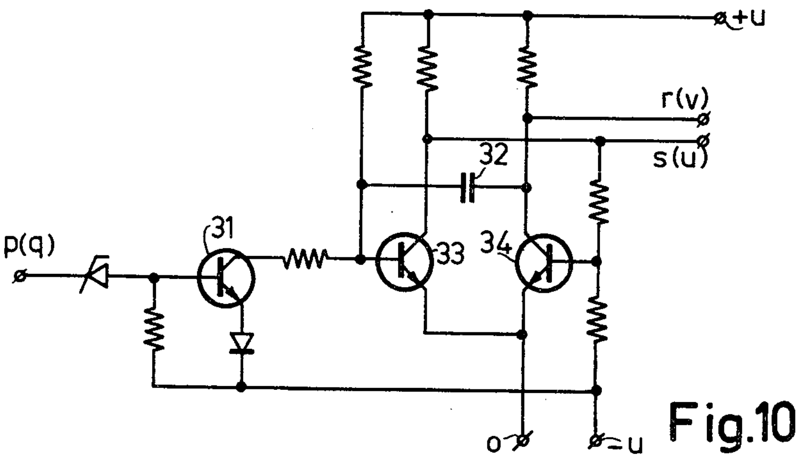

The arrangement of the two monostable triggers 24 and 25 is shown in FIG. 10. The transistors 33 and 34 indicate the known arrangement of the monostable trigger. Via the transistor 31, which receives a pulse via the input p(q), the bistable trigger is changed over. If it has previously been changed over, the capacitor 32 is already discharged partly. By a pulse at the input p(q) the initial state is restored, since the capacitor 32 is fully charged. The connections p(q), r(v) and s(u) correspond those of FIG. 9.

Figure 11:
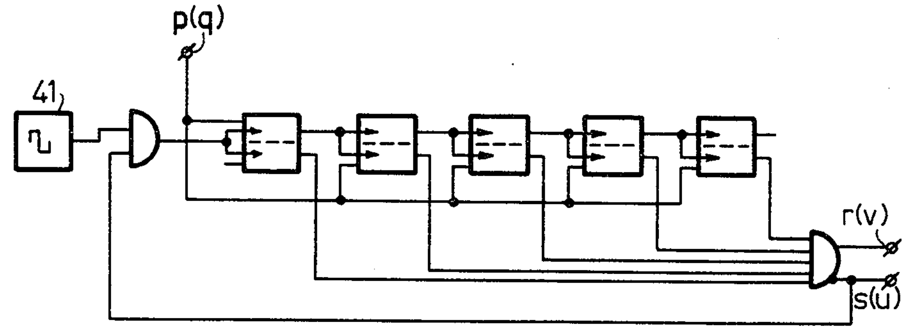
FIG. 11 shows finally a different embodiment of the delay circuit of FIG. 6.

The delay circuit shown in FIG. 9 allows only a restricted accuracy of the delay time. An arbitrarily accurate delay time is obtained by replacing the two monostable triggers 24 and 25 in the arrangement of FIG. 9 by a binary counter circuit. Such an arrangement is shown in FIG. 11. The input conductor p(q) and the two output conductors r(v) and s(u) correspond with those of FIG. 9. The clock pulse generator 41 of FIG. 11 may be employed in the arrangement of FIG. 9, in which the monostable triggers 24 and 25 are replaced by binary counters, for the two counters in common.

In the arrangement shown in FIG. 6 the pulses supplied from the outputs (*f*, *g*) of the delay circuits $V_2$ and $V_5$ may also be used directly for the propulsion of the light circle. Then the conjunctions $K_3$ and $K_6$ are omitted and the conductors *f* and *g* are directly connected to the inputs of the disjunction $D_7$.

For reducing disturbance the conductor *a* (FIG. 6) may be preceded by a circuit which allows only black and white pulses of given minimum duration to pass and which keeps shorter pulses away from the input *a*.

In the method described the output pulse received via the conductor *k* of FIG. 6 serves directly for the onward movement of the scanning circle. The scanning circle is moved on with constant speed as long as the duration of the output pulse. The distance over which the scanning circle is displaced therefore depends upon the duration of said pulse, which in turn depends upon the thickness of the scanned line. This dependence is undesirable.

The shift of the scanning circle becomes independent of the duration of the output pulse received via *k* of FIG. 6, when in a further embodiment of the method according to the invention this pulse is employed in a further arrangement for producing a new pulse, the duration and time shift of which relative to the center of said pulse are constant.

Figure 12:
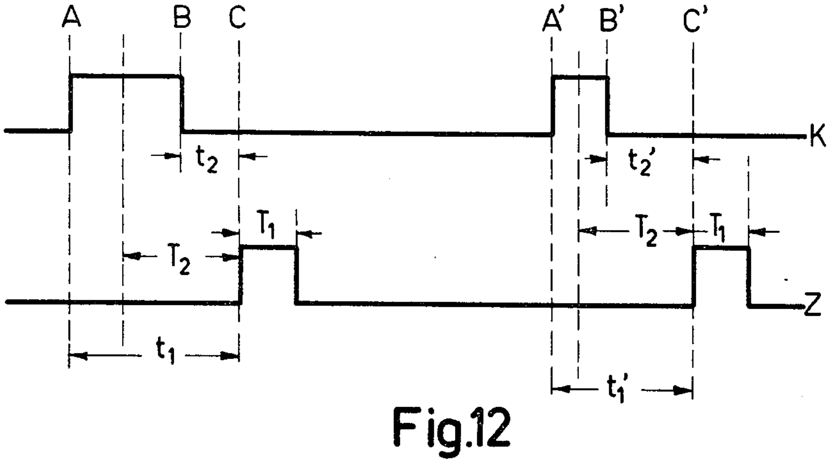
FIG. 12 illustrates in a pulse diagram an effective conversion of the output signal for the follow-up criterion.

This will be explained with reference to FIG. 12. Above two output pulses are indicated along the conductor *k* of FIG. 5 and below the pulses derived therefrom for the shift of the scanning circle. From FIG. 12 it will be obvious that $T_2$ can be calculated in the following manner from $t_1$ and $t_2$ and from $t'_1$ and $t'_2$ respectively:

$$T_2 = t_1 + t_2/2 = t'_1 + t'_2/2$$

From this relationship it follows that the pulse for the scanning-circle shift is obtained by applying from the instant A and A' respectively counting pulses of the frequency *f* to a counter which has previously been set to its starting position. From the instant B and B' respectively the counting frequency is doubled. At the instant C and C' respectively the counter attains its final position. The output pulse of the counter excites a monostable flip-flop which supplies the output pulse of the duration $T_1$, which is shifted by $T_2$ relatively to the center of the initial pulse.

Figure 13:
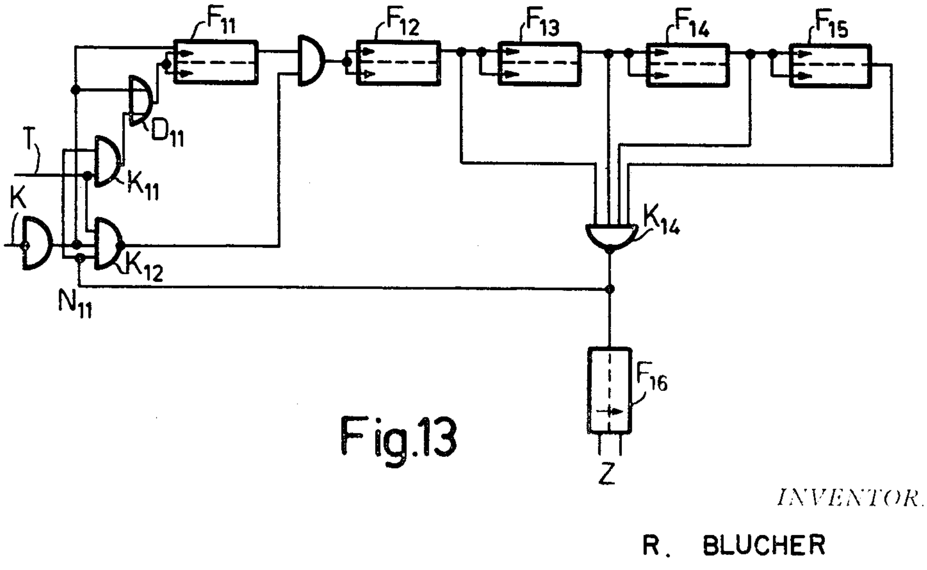
FIG. 13 is a block diagram of the circuit arrangement required for this purpose.

FIG. 13 shows an embodiment. The arrangement comprises the flip-flops $F_{11}$ to $F_{16}$, the disjunction $D_{11}$, the conjunctions $K_{11}$ to $K_{14}$ and the negation $N_{11}$. The conductor *k* is identical to the conductor *k* of FIG. 6. When the conductor *k* supplies the signal value "1," the clock pulse arrives via the conjunction $K_{11}$ and the disjunction $D_{11}$ at the pulse input of the flip-flop $F_{11}$. The output pulses of the flip-flop $F_{11}$ arrive across the conjunction $K_{13}$ at the input of the flip-flop $F_{12}$ and hence at the binary reducer $F_{12}$ of $F_{15}$. The binary converter is switched on until the signal at the conductor *k* changes over or the and-condition of the conjunction $K_{14}$ is satisfied. When the signal of the conductor *k* is changed over from 1 to 0, the flip-flop $F_{11}$ is held in a given state via the negation $N_{11}$ and the direct-current input of the flip-flop $F_{11}$. The output of the flip-flop $F_{11}$ supplies a "0" to the single input of the conjunction $K_{13}$. The clock pulse arrives across the conjunction $K_{12}$ and the conjunction $K_{13}$ at the input of the binary converter, flip-flop $F_{12}$. The binary converter is switched on until the and-condition for the conjunction $K_{14}$ is satisfied. The conjunction $K_{14}$ then supplies a "0" to the single inputs of the conjunctions $K_{11}$ and $K_{12}$; as a result no clock pulse arrives any more at the binary converter so that it remains in this state until the signal of the conductor *k* changes over from 0 to 1. At the output of the negation $N_{11}$ the signal changes over from 1 to 0 and this 0 passes via the disjunction $D_{11}$ as a single clock pulse to the clock pulse input of the flip-flop $F_{11}$. The flip flop $F_{11}$ is changed over, its output provides a change-over from 1 to 0 and this operates via the conjunction $K_{13}$ as a clock pulse for the binary converter, which is thus passed on by one position. As a result the and-condition for $K_{14}$ is no longer satisfied. The output of $K_{14}$ supplies a "1" so that the clock pulse is again applied to the binary converter via the conjunction $K_{11}$, the disjunction $D_{11}$ and the flip-flop $F_{11}$ and through the conjunction $K_{13}$. At this point the description of the circuit arrangement has started. The instant C of FIG. 12 is always attained, when the binary converter reaches its final position, that is to say, as soon as the and-condition of the conjunction $K_{14}$ is satisfied. The output of the conjunction $K_{14}$ passes at this instant from the state 1 to the state O and thus changes over the monostable flip-flop $F_{16}$, the output of which supplies the desired pulse for the propulsion of the scanning circuit.

When during the $(n + 1)^{th}$ revolution of the light spot two black arcs coincide with the arc stored during the $n^{th}$ revolution, the scanning circle embraces a ramification. A ramification is easily recognized by means of a counter which counts whether one or more arcs coincide with the previously stored arc.

For the recognition of the scanned sign, apart from ramifications and terminal points of dashes, also the constant recording of the direction of displacement of the scanning circle is important. The direction of displacement is constantly obtained in the following manner.

Be the time required by the light spot for covering one circle *T*. When the direction of travel is divided into *n* sectors, the direction of movement is obtained by applying counting pulses of the frequency $1/T{\cdot}n$ to the input of a counter and by recording the position of said counter at the instant C or C' respectively (FIG. 12).

The method of sign scanning described may be employed with the use of an image store, for example, in television camera tubes or in the form of an electrostatic storage tube. For this purpose a substrate with the signs to be scanned may be scanned, also during its transport, via any raster, for example, by a light spot scanning method. The resultant video signals are applied to an electrostatic storage tube, in which a charge image of the scanned substrate is obtained. In this image the signs can be scanned by the method described.

What is claimed is:

1. A method of recognition of characters in which a scanning beam, passed circularly across the overall line width of a sign is caused to follow up the contour of a sign and in which a signal sequence significant of the sign is derived from further circular scanning ramifications, uninterrupted lines and termini of the signs being recognized from the number of black-white transitions per scanning period comprising the steps of moving said beam at a constant angular speed, storing the arc determined by the width and phase of the scanning pulse and covering a line last scanned within a scanning cycle, comparing said arc with subsequent arcs of the lines covered during the next-following scanning cycle for assessing coincidence, recognizing coinciding arcs such that no coincidence for one or more scanning cycles indicate a terminus of a sign, one coincidence per scanning cycle indicates the presence of a non-ramified line and a plurality of coincidences per scanning cycle indicate a ramified line, and deriving the angular value for the direction of followup of the scanning circle from the values of beginning and termination of said coinciding arcs.

2. A circuit arrangement for recognizing line characters comprising means for optically scanning said characters in a series of character line crossing arc scans, photoelectric means responsive to said optical scanning for providing an electrical signal in response to a character line crossing, means applying said electrical signal to a first input of a plurality of multiple input conjunctive logic devices, first and second of said conjunctive devices each having a further input thereof connected to a respective output of a bistable trigger, means connecting the outputs of said first and second conjunctive devices to first and second delay circuits respectively, each of said delay circuits having a delay time of one scanning cycle and reset to an initial position in response to each incoming pulse, means connecting the outputs of each of said delay circuits to an input of third and fourth multi-input conjunctive devices, means connecting the outputs of said third and fourth conjunctive devices to a first disjunctive device for producing the desired output, fifth and sixth multi-input conjunctive devices, each having at least two inverted inputs, each inverted input responsive to said electrical signal, and a further input non-inverted of each of said fifth and sixth conjunctive devices respectively connected to each of said delay circuits for alternate excitation thereby, the output of said fifth and sixth conjunction devices respectively coupled to said bistable trigger for alternate excitation of said first and second conjunctions.

3. A circuit arrangement as described in claim 2, wherein said delay circuits are formed by monostable trigger circuits.

4. A circuit arrangement as described in claim 2, wherein said delay circuits are formed by binary counters.

5. A method as claimed in claim 1 characterized in that the duration and the time shift of the pulses for the follow-up of the scanning circle towards the center of the output pulses are constant.

6. A method as claimed in claim 5 characterized in that a binary converter is switched on from an initial position by a clock pulse of the frequency $f$ as soon as the output pulse corresponding to the coinciding arcs starts, the converter being switched on by double the frequency $2f$ up to the initial position as soon as the output pulse has terminated and in that when the initial position is attained, a monostable trigger circuit is changed over, which supplies the pulse (z) for the follow-up of the scanning circle.

7. A method as claimed in claim 1 characterized in that the angular co-ordinates of the scanning circle are divided into $n$ sectors by applying counting pulses of the frequency $1/T\cdot n$ to the input of a binary counter, the position of which at the beginning of the shift is recorded, wherein $T$ = duration of the scanning period.

8. A method as claimed in claim 1 characterized in that the scanning beam is formed by a light ray.

9. A method as claimed in claim 1 characterized in that the signs to be scanned are previously stored in an electrostatic image storage, and the scanning beam is formed by a cathode ray.

* * * * *